(12) United States Patent
Steinbach

(10) Patent No.: US 6,483,782 B1
(45) Date of Patent: Nov. 19, 2002

(54) TIME MESSAGE DELIVERY CD PLAYER ALARM CLOCK

(76) Inventor: Scott Bowman Steinbach, 2224 Carolinda Dr., Waco, TX (US) 76710

( * ) Notice: Subject to any disclaimer, the term of this patent is extended or adjusted under 35 U.S.C. 154(b) by 140 days.

(21) Appl. No.: 09/614,475

(22) Filed: Jul. 11, 2000

(51) Int. Cl.[7] .................................................. H04B 1/20
(52) U.S. Cl. .............................. 369/6; 369/22; 368/72; 368/109; 368/250
(58) Field of Search ........................... 369/6, 7, 19, 20, 369/21, 22, 23; 368/72, 73, 94, 109, 156, 272, 244, 250; 455/344, 349, 351; 340/500

(56) References Cited

U.S. PATENT DOCUMENTS

| 5,212,672 | A | * | 5/1993 | Loisch et al. ................. 368/79 |
| 5,365,494 | A | | 11/1994 | Lynch |
| 5,369,797 | A | * | 11/1994 | Tyree ........................... 455/349 |
| D365,823 | S | * | 1/1996 | Borgonovo ................. D14/168 |
| 5,555,536 | A | * | 9/1996 | Rolf et al. ..................... 369/19 |
| 5,832,067 | A | | 11/1998 | Herold |
| 6,310,833 | B1 | * | 10/2001 | Guyett et al. .................. 368/63 |

FOREIGN PATENT DOCUMENTS

DE     195-08-365 A1 * 9/1996

* cited by examiner

Primary Examiner—Tan Dinh
(74) Attorney, Agent, or Firm—Hughes & Luce LLP

(57) ABSTRACT

An apparatus and method are provided for automatically playing a recorded message, from a uniquely formatted encrypted CD, correlated to a specific date and a time of day as an option on a CD clock radio or the like. Disclosed are means for distinguishing the unique CD format and thereafter following a prescribed process for decrypting and playing. Otherwise all device functions and options operate in their conventional modes.

10 Claims, 5 Drawing Sheets

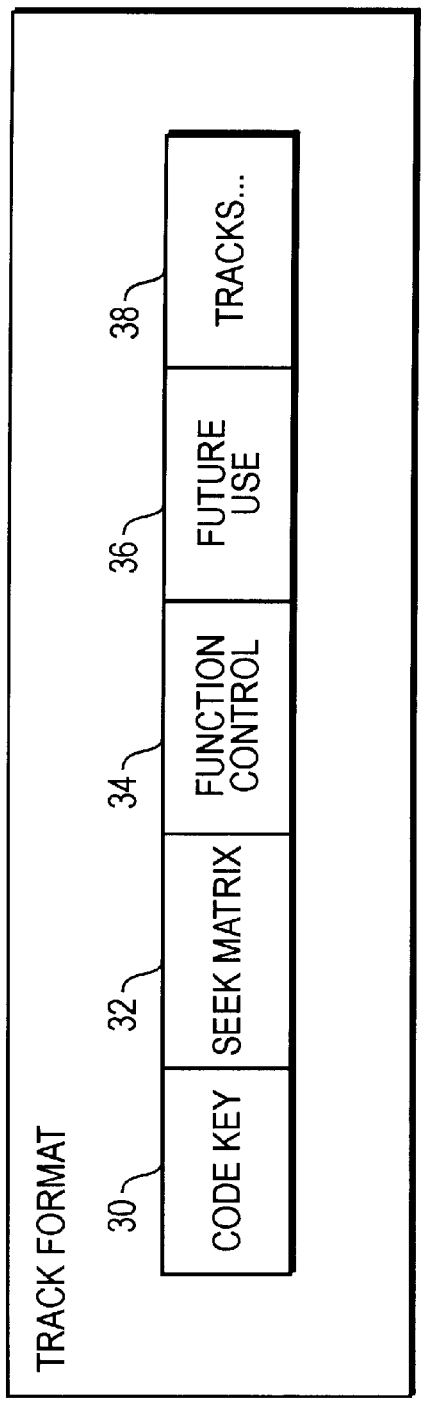
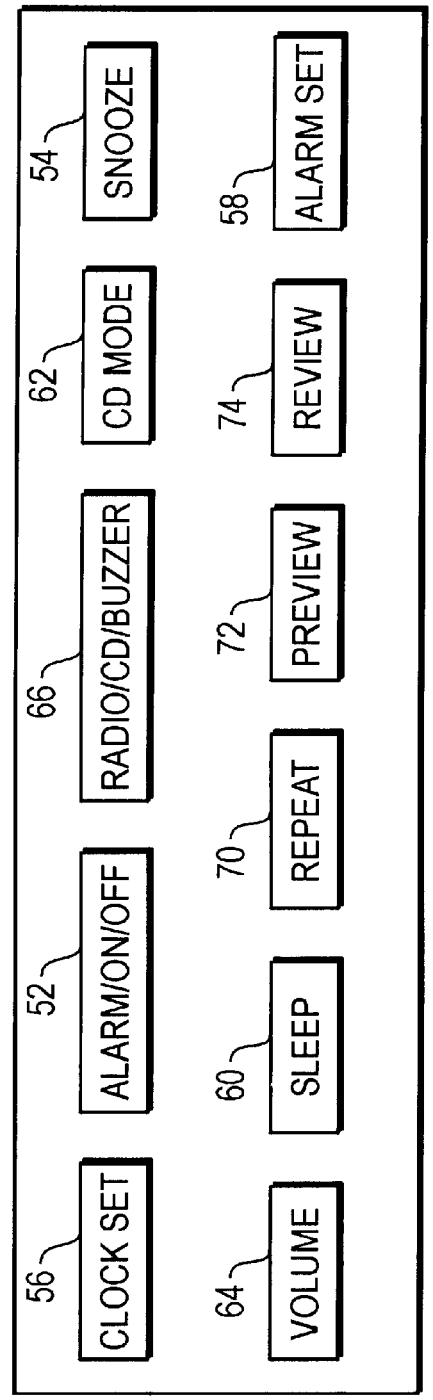

TIME MESSAGE DELIVERY CD PLAYER ALARM CLOCK

FIELD OF INVENTION

The present invention relates to an electronic alarm clock equipped with a CD player. More particularly, it relates to a CD player clock device for playing date/time correlated material.

BACKGROUND OF THE INVENTION

Clock radios, which provide for a user to choose when and to what they will awaken are well known. Users may awaken to an alarm signal, AM or FM radio stations, or a CD or tape recording.

U.S. Pat. No. 5,832,067 to Herold discloses apparatus for transferring information from a server as a function of data input to the server so that a user may preselect a message to be played at a specific time.

U.S. Pat. No. 5,360,494 discloses a radio alarm clock with a capability to display user input reminders for calendar events.

The choices offered to users for waking sounds are limited to user chosen CDs, radio bands and stations, or perhaps a previously set reminder. It would be desirable to have other wake-up sound options.

SUMMARY OF THE INVENTION

The present invention contemplates an additional function for CD Alarm Radios, which allows a user to wake to recorded information uniquely correlated to the calendar date and time of day. This is accomplished by providing in the CD player device an apparatus for distinguishing between standard format CD recordings or specially formatted CD recordings formatted in accordance with the invented device.

BRIEF DESCRIPTION OF THE DRAWINGS

The above and other features and advantages of the present invention will become apparent from the following description of a preferred embodiment taken in conjunction with the accompanying drawing wherein like reference numerals are used throughout to refer to the same elements and wherein:

FIG. 2 is an illustrative CD format useful with the present invention;

FIG. 3 illustrates a user interface panel suitable for use with the present invention;

DETAILED DESCRIPTION OF THE PREFERRED EMBODIMENT

Figure 1:
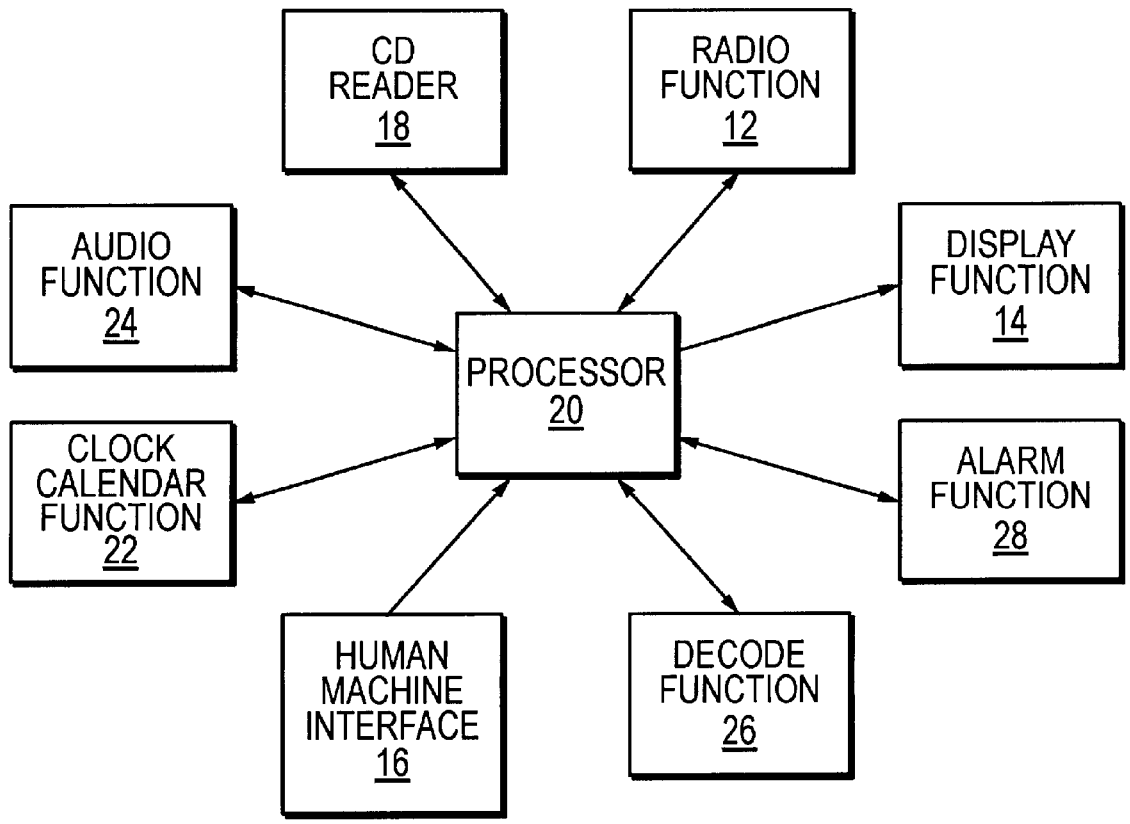
FIG. 1 is a block diagram of a CD player in accordance with the present invention.

FIG. 1 shows the major components of a clock radio embodying the present invention in block form. Those elements of the device common in the prior art function are well understood by those skilled in the art and will not be described in great detail.

The present invention is embodied in device 10, which may be a CD Clock radio or the like. Device 10 includes Radio function 12, Display function 14, Human Machine Interface function 16, CD Reader function 18, Processor 20, Clock Calendar function 22, Audio function 24, Decode function 26, and Alarm function 28.

Processor 20 includes logic, inter alia, in accordance with the present invention, for determining whether a standard CD or one in accordance with the invention is inserted. If a standard CD is detected operation of device 10 proceeds as usual according to typical CD or CD clock radio functions.

FIG. 2 represents an illustrative CD header and track format in accordance with the invention. While an exemplary track format is shown and described, those having skill in the art will appreciate that other formats or track layouts may be employed.

For the operation of the present invention it is necessary, however, that processor 20 be appropriately programmed for recognizing the CD format and function accordingly. FIG. 2, thus, shows key elements of a CD message track 30, in keeping with the present invention. Segment 32 contains Code Key designating the special CD readable by processor 20 (FIG. 1). Code Key segment 32 is used by processor 20, as will be described below, for decrypting the remainder of track 30. CDs formatted in keeping with the present invention may be played only in CD players whose processors are appropriately programmed.

The Seek Matrix is encoded in segment 34; and Function Control, in segment 36. A Future Use segment 38 is reserved for follow-on features and functionality, which may arise in the future. Message segment 40 follows Future Use segment 38. Processor 20 uses the information in Seek Matrix segment 34 to determine which Message track in Message segment 40 corresponds to a specific date and time of date.

Function Control segment 36 is designated to hold CD provider-specific information about how to interpret or respond to events in a customized manner. For example, a CD provider may decide that preview of CD messages corresponding to future dates is not allowed. Function Control segment 36 could be used to communicate that functionality to the device of the invention.

Providers of CDs formatted for use in device 10, FIG. 1, create content correlated to particular dates, and further, to general times of day. By way of example, a CD provider may choose seasonal, daily inspirational messages for morning and evening listening by subscribers. Providers may distribute such CDs on a monthly, quarterly or other temporal basis to those subscribers having a device such as that shown in FIG. 1. The encrypted content may only be played on players equipped with a decrypting processor 20.

FIG. 3 shows an exemplary user interface panel 50 for communicating with processor 20, FIG. 1. Panel 50, related to interface box 16, FIG. 1, is strictly illustrative and is shown to provide an understanding of the options functionally available to a user of a device in accordance with the present invention. Obviously, other arrangements and combinations are within the skill of art. Rectangular push buttons are shown for, simplicity but other means, such as dials, sliders or the like, for enabling user selection of options are fully within the scope of the present invention.

As shown in FIG. 3, several options such as ON/OFF, VOLUME, SNOOZE, SLEEP, CLOCK SET, ALARM SET and the like are standard in the clock radio art. The following description emphasizes functions new or modified as part of the present invention.

Figure 5:
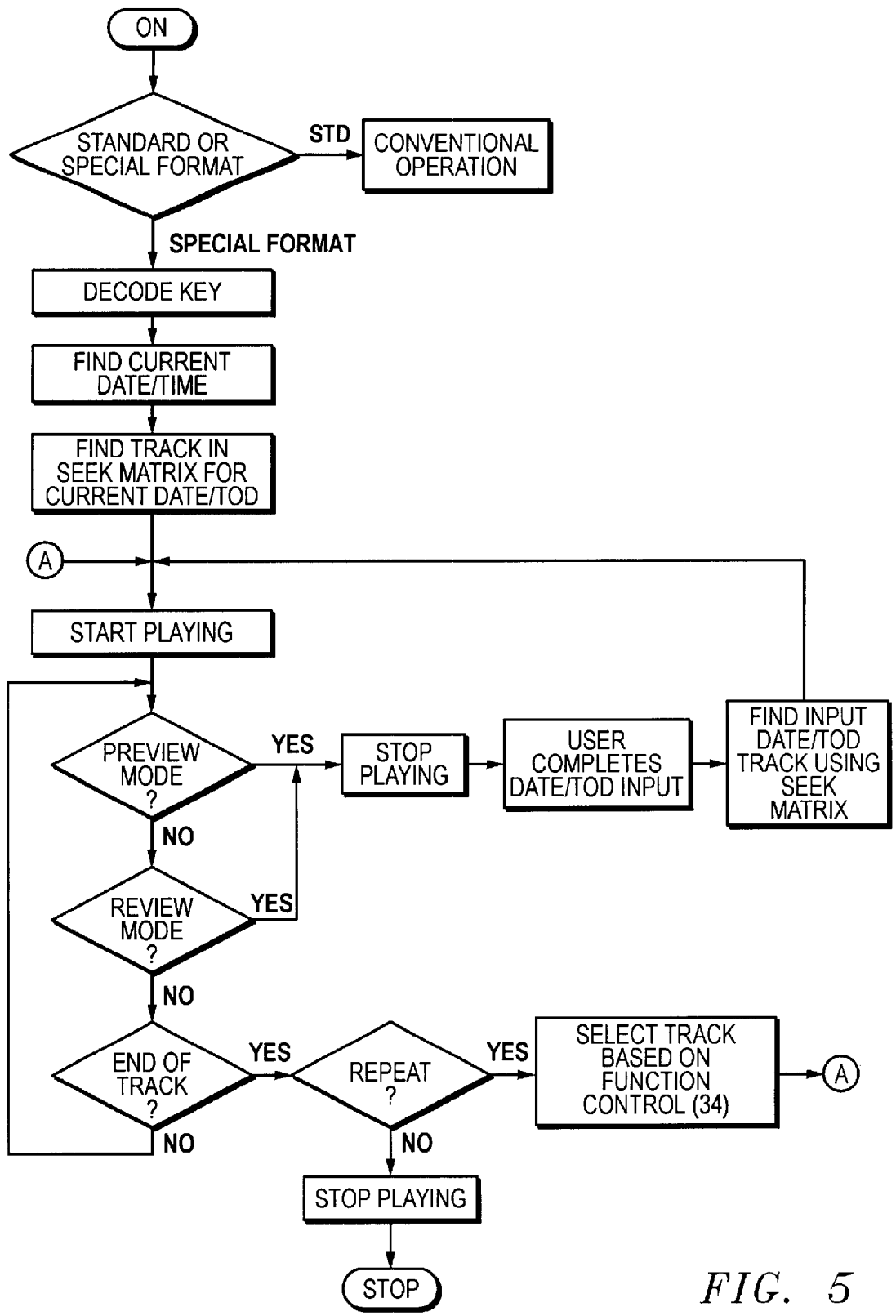
FIG. 5 is a logic flow diagram of the operation of the present invention in ON mode.

A CD clock radio type device in accordance with the present invention operates in a conventional manner unless a CD formatted in a special manner as exemplified in FIG. 2 is inserted. Thus, user option input boxes ALARM/ON/OFF 52, SNOOZE 54, CLOCK SET 56, ALARM SET 58, SLEEP 60, CD MODE 62, VOLUME 64, and RADIO/CD/BUZZER 66 function normally if a standard CD is inserted or no CD is present. CD MODE box 62 provides additional function when a CD format such as depicted in FIG. 2 is encountered. The same is true of REPEAT box 70. PREVIEW box 72 and REVIEW box 74 functions operate as shown in FIG. 5 only when a specially formatted CD, e.g., as shown in FIG. 2, is inserted. REPEAT, PREVIEW and REVIEW operate normally for a standard format CD.

User option selections and the subsequent operation of device 10, FIG. 1, will be more clearly understood having reference to FIGS. 3 through 6.

Figure 4:
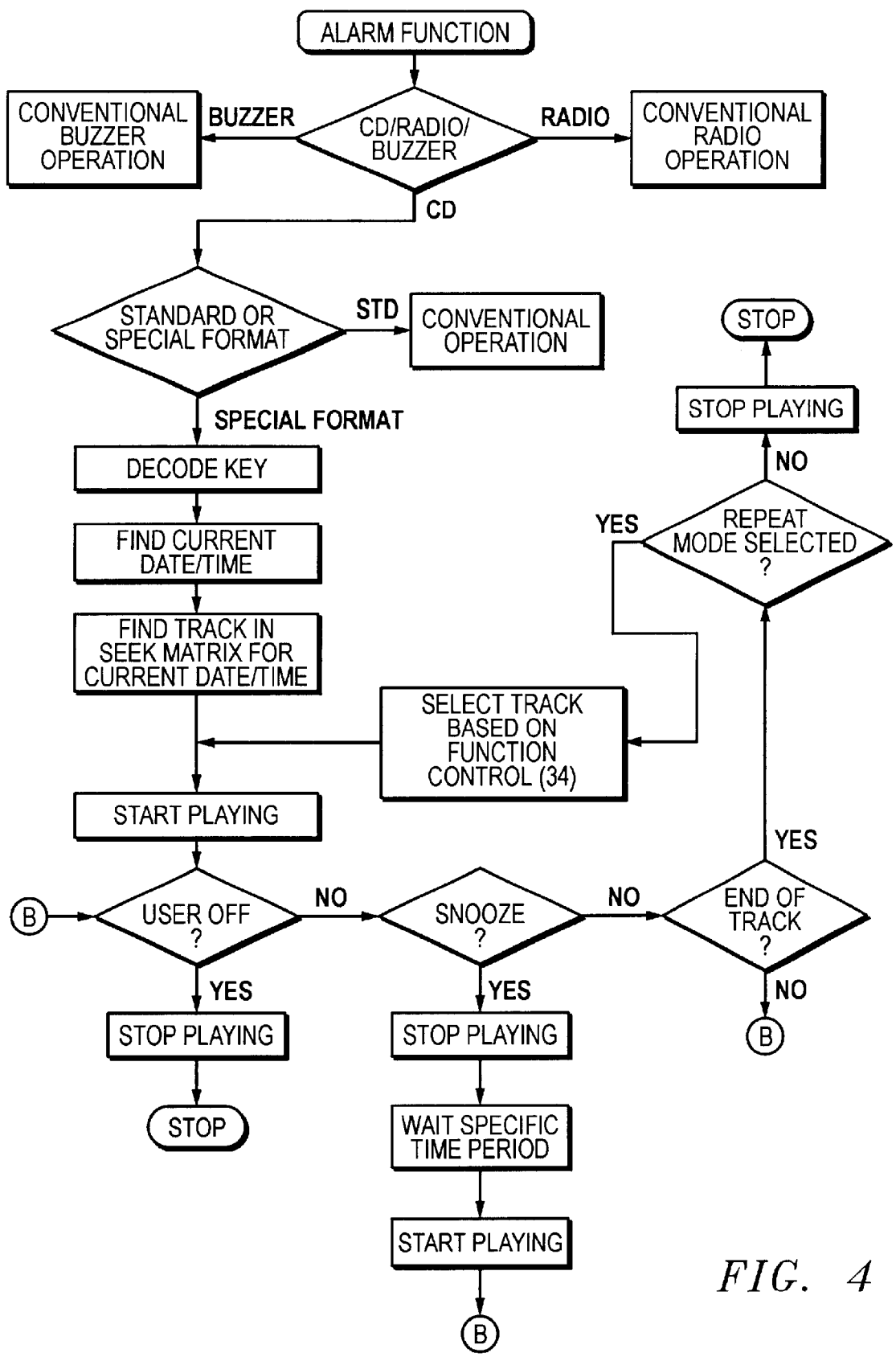
FIG. 4 is a logic flow diagram of the operation of the present invention in ALARM mode

FIG. 4 shows the logic followed by processor 20, FIG. 1, in response to user option choices in the ALARM mode. FIG. 4 illustrates the logic executed when a user of device 10, FIG. 1, desires that device 10 operate as an alarm. The logic begins at terminal 100. At test 102, the logic determines whether sound from a buzzer, radio or CD has been chosen by the user. Operation of device 10 proceeds in a conventional manner, well understood in the art, if a buzzer alarm or radio alarm is desired as indicated at steps 104 and 106, respectively.

If the user has chosen CD, then the logic determines at test 108 whether a CD is in position and, if so, in which of at least two formats it is recorded. Not shown, but well understood, is the generation of an alert to the user in the case where no CD has been loaded. If the logic finds a CD in a standard format, conventional operation proceeds at step 110.

Upon finding a specialized, non-standard format such as described in connection with FIG. 2, the logic decodes the Code Key (32, FIG. 2) at step 112. Thereafter the logic obtains the current date and time from the clock/calendar (22, FIG. 1) at step 114. Next, at step 116, the logic locates within Seek Matrix 34, FIG. 2, a date/time entry corresponding to the current date/time obtained in step 114, and plays the appropriate CD track at step 118. The logic then awaits further user input or for an end of track condition. If the logic receives an off signal from the user as indicated at test 120, then CD play is shut down at step 122 and device 10 operation ends at terminal 124.

If no user Off actuation is detected at test 120, then the logic checks at step 126 whether the user has hit the snooze button. If so, at step 128, the logic ceases CD play. After waiting a predetermined period of time at step 130, CD play restarts at step 132 and the logic branches back to step 120.

If, however, there is no SNOOZE request, the logic then checks if an end of track condition is detected at step 134, whence the logic branches back to step 120.

Once the end of track is reached, CD play is stopped at step 136 and the logic checks at step 138 for a user selection of repeat mode. If not found, operation of device 10 ceases at terminal 142.

If the user has chosen REPEAT mode, then at step 140 the logic looks at the Function Control data (36, FIG. 2) and uses that information to select a track. Control is passed to step 120 for playing the selected track.

FIG. 5 illustrates the logic performed in processor 20 when user options are entered in the ON, i.e. non-ALARM mode. When a device such as device 10, FIG. 1, is in the ON-mode, processor 20 begins at terminal 200 and at test 202 the logic determines whether a standard or specially formatted CD is present as above described. If processor 20 determines that a standard CD is present, conventional operation occurs as indicated at step 204. Having detected a specially formatted CD, the logic of step 206 decodes a key such as a Code Key 32 in FIG. 2. The logic next obtains a current date and time at step 208 and at step 210 finds the track using Seek Matrix 34, FIG. 2, corresponding to the current date and time. At step 212, the CD is played. At step 214, the logic tests whether the PREVIEW mode has been set by the user. If so, the logic stops the CD player at step 216 while awaiting a user input completing the desired advance date and time of day at step 218. Thereafter, at step 220, the logic utilizes the user input advance date and time of day to find track matching that date and time of day in the Seek Matrix and control returns to step 212.

If at step 214, the PREVIEW mode was not found to be set, a test is made at step 222 to determine whether a REVIEW mode is active. If so, control passes to step 216. If REVIEW mode has not been activated, a test is made at step 224 to determine whether the end of track has been reached. If not, control is returned to step 214.

However, if the end of track has been reached, play of the CD is stopped at step 226 and the logic checks at step 228 to see if REPEAT mode has been activated. If not, the operation of device 10 concludes at step 230. If, however, the REPEAT mode has been activated, the logic then goes to step 232 to select a track for REPEAT play based on the contents of function control 36 in FIG. 2. Thereafter, control returns to step 212.

Figure 6:
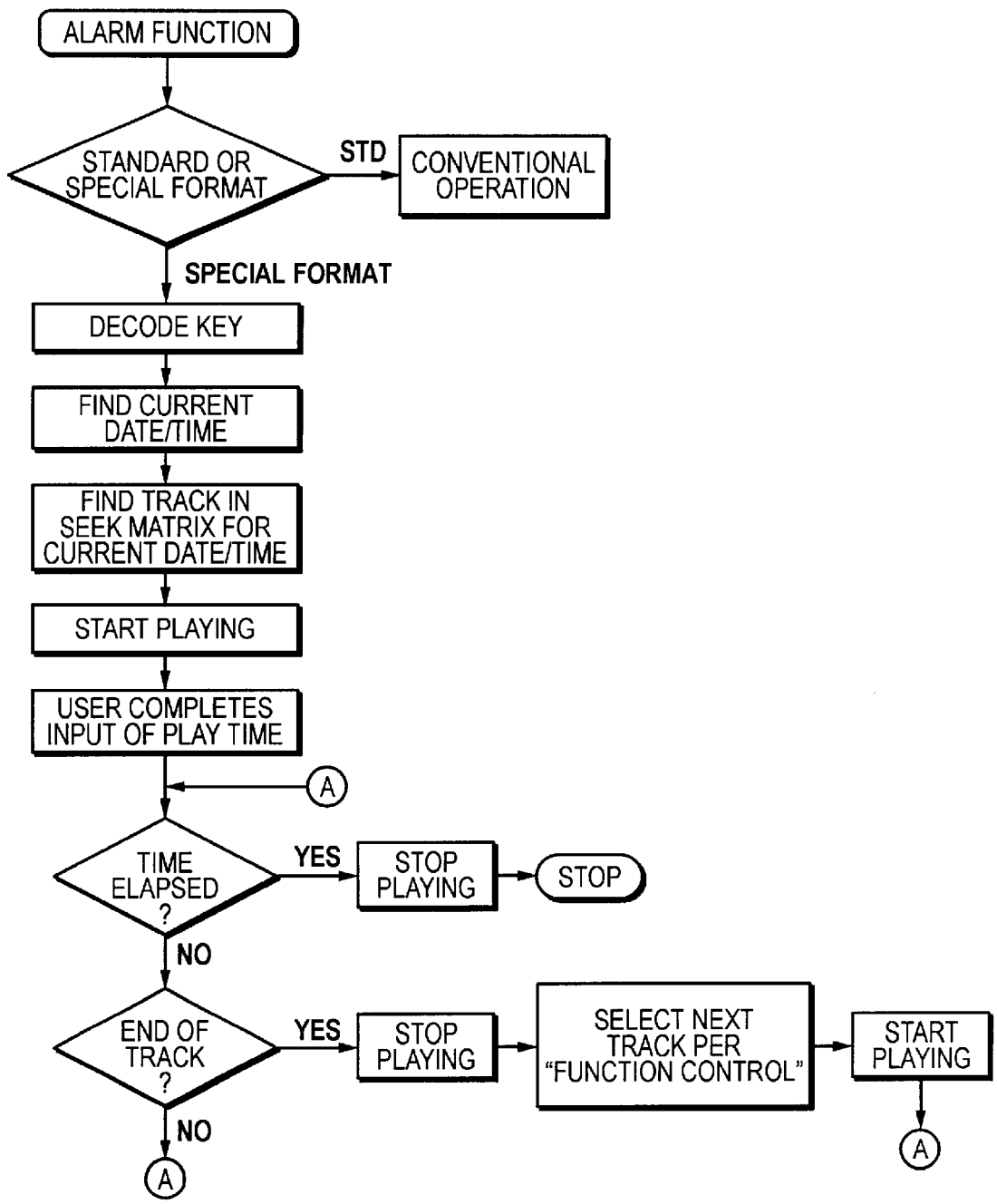
FIG. 6 is a logic flow diagram of the operation of the invented device present invention in SLEEP mode.

FIG. 6 illustrates the logic performed in Processor 20 when user options are entered in the SLEEP, i.e. non-ALARM mode. The logic begins at terminal 300. At step 302, the logic determines whether the CD is in a standard or special format and, if it is a standard format CD, conventional operation ensues as indicated at step 304.

If, however, a specially formatted CD has been inserted, the logic proceeds to decode a key at step 306 and to obtain the current date and time at step 308. Having obtained the current date and time of day, the logic uses a Seek Matrix on the CD to find the track on that CD corresponding to the current date and time of day at step 310. At step 312, the CD is played and at step 314 the logic executing in processor 20 awaits input of play time by the user of device 10. At step 316, a test is made to see if that time has elapsed. If it has, then at step 318, play of the CD ceases and operation of device 10 stops at step 320. If, however, the time has not yet elapsed, then at step 322 the logic determines whether the end of track has been reached. If not, control is returned to step 316. If, however, the end of track has been reached, then at step 324 play of the CD ceases. The logic then selects the next track in accordance with the contents of the function control segment of the CD at step 326 and play of the CD commences at step 328. Thereafter, control returns to step 316.

While the present invention has been shown and described with reference to a particular embodiment, it will be understood by those skilled in the art that the above and other modifications in form and detail may be made without departing from the spirit and scope of the invention as hereinafter claimed.

What is claimed is:

1. In a clock radio CD player apparatus including CD play mode controls, a clock, a calendar, user controls for setting wake-up times, the improvement comprising:

means for determining whether a CD inserted into the CD player is in a particular format;

means responsive to said means for determining said CD is in a particular format for accessing and playing a track, having a date and time of day indicator, when said track date and time match with a current date and time of day in said calendar and clock.

2. The apparatus of claim 1 wherein said means for determining includes:

means for sensing and decoding a key code on said CD indicating said particular format; and means operable when a key code is not sensed for operating said clock radio CD player conventionally.

3. The apparatus of claim 2 wherein said means for accessing additionally includes:

means for interpreting a desired play mode from among a plurality of possible play modes.

4. The apparatus of claim 3 wherein said plurality of possible play modes comprises SLEEP, SNOOZE, REPEAT, REVIEW and PREVIEW.

5. The apparatus of claim 2 wherein said means for determining additionally includes:

means for obtaining said current date and time of day; and means for indicating an error condition if said current date and time of day match no entry in a seek matrix on a CD.

6. The apparatus of claim 5 wherein said particular CD format comprises:

an encrypted header key for use in decrypting CD track data.

7. The apparatus of claim 6 wherein said header additionally comprises:

a function control segment having CD specific rules for use.

8. The apparatus of claim 7 additionally including:

means for searching said function control segment for a CD specific mode when said play mode is PREVIEW or REVIEW.

9. The apparatus of claim 1 wherein said means for determining comprises:

means for comparing a standard format header with a corresponding portion of a CD inserted in said CD player.

10. The apparatus of claim 9 additionally comprising:

means for alerting an error condition if a CD in said particular format contains no track date and time of day indicator corresponding to said current date and time of day.

\* \* \* \* \*